(12) United States Patent
Robineau et al.

(10) Patent No.: US 9,564,934 B2
(45) Date of Patent: Feb. 7, 2017

(54) TELECONTROL FOR AUTOMOBILE COMPRISING A DEVICE FOR SUPPRESSING MAGNETIC COUPLING

(71) Applicants: VALEO SECURITE HABITACLE, Creteil (FR); VALEO INTERIOR CONTROLS (SHENZHEN) CO., LTD, Shenzhen (CN)

(72) Inventors: José Robineau, Creteil (FR); Jean-Michel Tessier, Creteil (FR); Yalong Liu, Shenzhen (CN); Chunlin Wu, Shenzhen (CN)

(73) Assignee: VALEO SECURITE HABITACLE, Créteil (FR)

( * ) Notice: Subject to any disclaimer, the term of this patent is extended or adjusted under 35 U.S.C. 154(b) by 53 days.

(21) Appl. No.: 14/652,405

(22) PCT Filed: Dec. 17, 2013

(86) PCT No.: PCT/EP2013/076959
§ 371 (c)(1),
(2) Date: Jun. 15, 2015

(87) PCT Pub. No.: WO2014/095908
PCT Pub. Date: Jun. 26, 2014

(65) Prior Publication Data
US 2015/0311924 A1    Oct. 29, 2015

(30) Foreign Application Priority Data

Dec. 21, 2012 (EP) .................................... 12199249

(51) Int. Cl.
*G05D 1/00* (2006.01)
*G06F 7/00* (2006.01)
(Continued)

(52) U.S. Cl.
CPC .......... *H04B 1/0346* (2013.01); *G07C 9/00007* (2013.01); *G07C 9/00309* (2013.01);
(Continued)

(58) Field of Classification Search
CPC combination set(s) only.
See application file for complete search history.

(56) References Cited

U.S. PATENT DOCUMENTS

2010/0003941 A1    1/2010   Kojima
2010/0137019 A1    6/2010   Pedersen

FOREIGN PATENT DOCUMENTS

EP    0 903 456 A1    3/1999
JP    2000-216716 A   8/2000

OTHER PUBLICATIONS

International Search Report issued in PCT/EP2013/076959 mailed on Mar. 4, 2014 (3 pages).

*Primary Examiner* — Bhavesh V Amin
(74) *Attorney, Agent, or Firm* — Osha Liang LLP

(57) ABSTRACT

The invention relates to a telecontrol (TEL) for the locking/unlocking and the starting of a motor vehicle comprising: —an electronic circuit (ELEC) comprising at least one pathway comprising an input pin (BE) and an output pin (BS), —a first radiofrequency antenna (ANT1) comprising a first loop disposed in the plane of the electronic circuit (ELEC), —a second radiofrequency antenna (ANT2) comprising a second loop disposed in the plane of the electronic circuit (ELEC), said second antenna (ANT2) comprising: —an input connector (CE) connected to the input pin (BE), —an output connector (CS) connected to the output pin (BS), —a tuning capacitor (C) linked to the electronic circuit (CIRC), for tuning the second antenna (ANT2) to a tuning frequency, characterized in that it comprises: —an inductive input component (COMP_E) placed between the input connector (CE) and the input pin (BE), and/or —an inductive
(Continued)

output component (COMP_S) placed between the output connector (CS) and the output pin (BS).

8 Claims, 3 Drawing Sheets

(51) Int. Cl.
    *H04B 1/034*     (2006.01)
    *G07C 9/00*     (2006.01)
    *H04B 1/04*     (2006.01)

(52) U.S. Cl.
    CPC ............ *H04B 1/04* (2013.01); *G07C 9/00944* (2013.01); *G07C 2009/00793* (2013.01)

TELECONTROL FOR AUTOMOBILE COMPRISING A DEVICE FOR SUPPRESSING MAGNETIC COUPLING

TECHNICAL FIELD OF THE INVENTION

The technical field of the invention is, in general, that of electronic devices incorporating radio frequency antennas, and more particularly that of telecontrols for opening/closing doors and starting an automobile by radio waves.

The present invention relates to a telecontrol comprising at least two radio frequency antennas, the geometry of the telecontrol ensuring that there is a high level of integration of these antennas, and hence a strong interaction therebetween.

PRIOR ART

The arrival on the automobile market of 'hands-free' access and starting systems for manual or automatic locking and unlocking of doors of a vehicle, and starting the engine thereof without the use of a conventional key, involves the cohabitation in a small volume (the volume of an electronic key head) of two separate wireless communication systems each possessing its own transmission/reception antenna.

In order to preserve ergonomics and an appropriate style for this key, the surface and volume assigned to the electronics portion require a close proximity, or even an overlapping of the radio frequency antennas present on the electronic circuit.

A telecontrol is known for opening/closing doors and starting the engine, of which a front view is represented in FIG. 1 and a back view is represented in FIG. 2, which comprises:
- a printed circuit 10 including an assembly of electronic components 11, half filled by a ground plane 12, and supporting a power supply cell 13,
- a conductive track 14 arranged along the circuit 10 and forming, with the ground plane 12, an optimized surface for a radio frequency antenna, called the first antenna ANT1, for frequencies between 300 and 1000 MHz, notably in the 315 MHz, 434 MHz and 868 MHz bands.
- a magnetic antenna, called the second antenna ANT2, composed of three orthogonal coils, of which one loop 15 is located in the plane of the printed circuit 10, acting as a communication antenna for the transponder and 'hands free' system, and operating at the low frequency of 125 kHz.

It is to be noted that two antenna loops operating on different frequency ranges are thus included in the same plane.

The performance of each portion of the telecontrol is optimized by tuning each antenna so as to cause a maximum current to flow in the first antenna ANT1, or to produce a maximum voltage at the terminals of the second antenna ANT2. The voltage at the terminals of the second antenna ANT2 is notably maximized by a capacitor C the value of which is calculated so as to achieve a tuning at 125 kHz with the inductive portion L of the second antenna ANT2 according to the relationship:

$$f_{Tuning} = \frac{1}{2\pi\sqrt{LC}}$$

The equivalent electronic diagram of the telecontrol is represented in FIG. 3.

At other frequencies, and particularly in the band of 300 to 1 000 MHz, the previously calculated tuning capacitor C represents an impedance of very low value (equivalent to a short circuit) while the second antenna ANT2, i.e. a magnetic loop, is equivalent to a complex impedance with an imaginary positive or negative portion X: $Z=R+jX$ The physical presence of this element Z associated with the tuning capacitor C at 125 kHz (short circuit at high frequencies) and the tracks of the electronic circuit connecting the various components, form a secondary circuit that can be tuned to a frequency in the band 300 to 1 000 MHz, thus creating an unwanted parasitic loop, of a tuning frequency according to the value of the imaginary portion X and the routing of the printed circuit. According to the laws of physics and electromagnetics, the presence on the same plane of two loops, the first antenna (operating between 300 to 1 000 MHz) and a loop of the first antenna (operating at 125 kHz) generates an inductive coupling between these two elements. It follows that during the use of the first antenna in transmission mode, the current flowing in the main loop corresponding to the first antenna, generates the creation of a magnetic field. By inductive coupling, this field causes an induced magnetic field in the secondary loop (second antenna) opposing the field of the main loop.

This reaction causes an unwanted absorption of the energy transmitted to the first antenna and therefore a reduction in the electric field radiated by this antenna. Similarly, by the duality principle, a receiver using this antenna will have its sensitivity performance degraded. Thus, a reduction in the operating distance of the radio frequency telecontrol is observed. It is to be noted that this situation is not predictable since it depends on the value of the reactance of the impedance of the second antenna in a frequency band for which the latter is not specified.

Several solutions exist for counteracting this effect, but these all have disadvantages:
- A first solution consists in modifying the routing of the printed circuit board with a view to reducing the inductive portion of the tracks leading to the second antenna. However, the resonance of the parasitic circuit is still present at high frequency owing to the need for dimensional placement of the circuit components.
- A second solution consists in sorting the second antennas for selecting only components of which the value of the imaginary portion is positive. However, this solution is expensive for mass production.
- A third solution consists in increasing the power supplied to the first antenna for returning to the required level. However, a power limit imposed by the electronic components must be observed. In addition, the power supply system by lithium cell is not capable of providing the necessary energy. Finally, there is a risk of saturation and parasitic coupling of the component powering the first antenna, causing a malfunction in the system or even destruction of components.

GENERAL DESCRIPTION OF THE INVENTION

The object of the invention is therefore to provide a telecontrol for locking/unlocking and starting a motor vehicle not presenting any magnetic coupling problems.

To do this, the invention provides a telecontrol for locking/unlocking and starting a motor vehicle comprising:
- an electronic circuit including at least one path comprising an input pin and an output pin, a first radio frequency antenna including a first loop arranged in the plane of the electronic circuit,
a second radio frequency antenna including a second loop arranged in the plane of the electronic circuit, said second antenna comprising:
  an input connector connected to the input pin,
  an output connector connected to the output pin,
  a tuning capacitor connected to the electronic circuit, for tuning the second antenna on a tuning frequency, comprising:
    an inductive input component placed between the input connector and the input pin, and/or
    an inductive output component placed between the output connector and the output pin.

Thanks to the invention, the imaginary portion of the impedance of the LF antenna seen in high frequency is always positive. Thus, since the secondary loop is never capacitive, it cannot be tuned with the main loop. Since the secondary loop is isolated from the main loop, magnetic coupling is avoided.

In addition to the features that have just been mentioned in the preceding paragraph, the telecontrol according to the invention may present one or more of the following additional features, considered individually or according to all technically possible combinations:
  the inductive value of the input component and/or the inductive value of the output component are less than one percent of the inductive value of the second antenna. Thus, the input component and/or the output component contribute little to the inductance of the loop.
  the input component is positioned so as to minimize the distance between the input connector and the input pin, and/or the output component is positioned so as to minimize the distance between the output connector and the output pin.
  the input component is directly connected to the input connector and/or the output component is directly connected to the output connector.
  the input component and/or the output component are integrated into the housing of the second antenna.
  the reactive impedance value of the second loop is positive.
  the electronic circuit comprises at least two paths, and the path considered is that presenting the most risk of inductive coupling between the first loop and the second loop.
  the input component and/or the output component are pure inductances.

The invention and its various applications will be better understood on reading the following description and examining its accompanying figures.

BRIEF DESCRIPTION OF THE FIGURES

The figures are given only as a guide and are in no way restrictive of the invention. The figures depict.

DETAILED DESCRIPTION OF AT LEAST ONE EMBODIMENT OF THE INVENTION

Unless otherwise specified, the same element appearing in different figures has a single reference.

Figure 4:
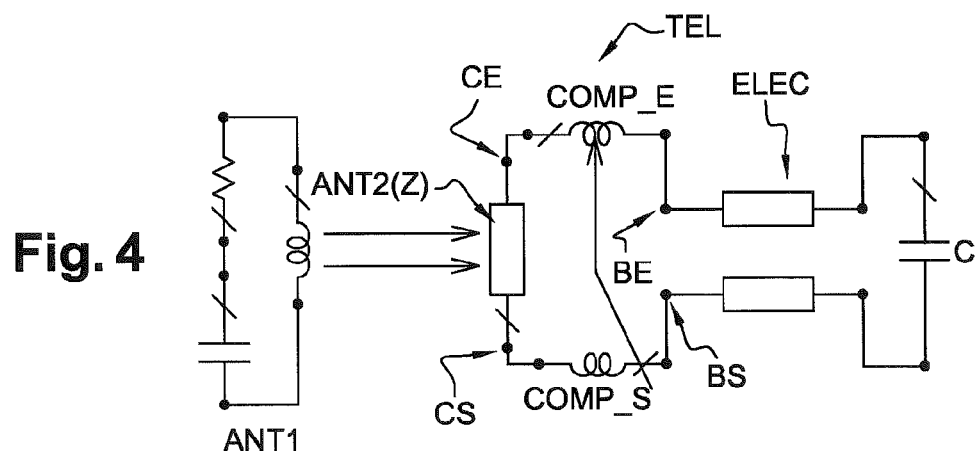
Figure 5:
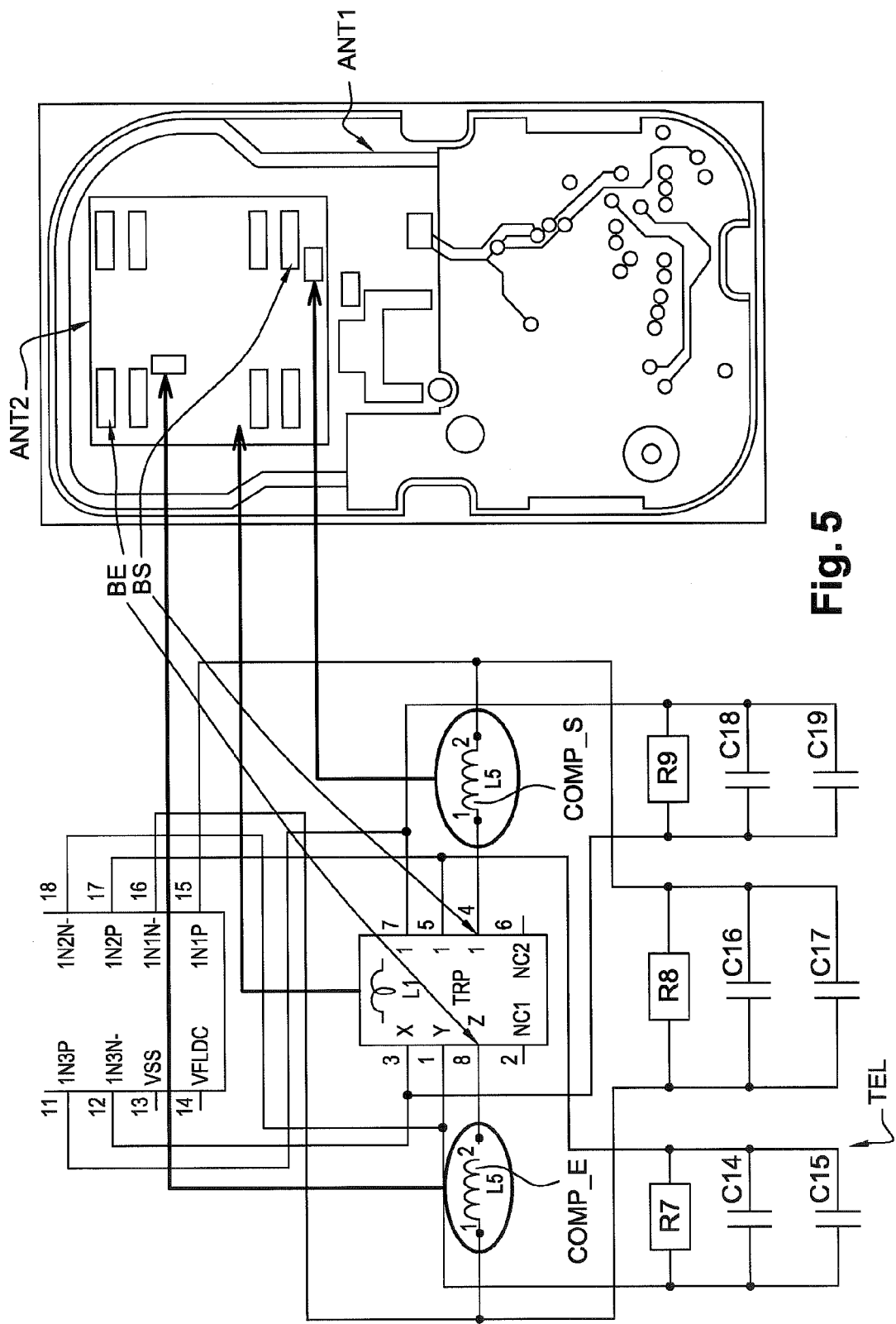

FIGS. 4 and 5 illustrate an equivalent electronic diagram of a telecontrol TEL for an automobile according to a non-restrictive embodiment of the invention.

The telecontrol TEL comprises:
  an electronic circuit ELEC including at least one path comprising an input pin BE and an output pin BS,
  a first radio frequency antenna ANT1 including a first loop arranged in the plane of the electronic circuit, operating at high frequencies, notably between 300 and 1 000 MHz,
  a second radio frequency antenna ANT2 including a second loop arranged in the plane of the electronic circuit, operating at low frequency, notably at 125 kHz, said second antenna ANT2 comprising:
    an input connector CE connected to the input pin BE,
    an output connector CS connected to the output pin BS,
    a tuning capacitor C connected to the electronic circuit ELEC, for tuning the second antenna ANT2 on a tuning frequency, as explained previously.

As explained previously, at high frequencies, the previously calculated tuning capacitor C represents an impedance of very low value (equivalent to a short circuit) while the second antenna ANT2, i.e. a magnetic loop, is equivalent to a complex impedance Z with an imaginary positive or negative portion X: $Z=R+jX$.

In the embodiment described, an inductive component is introduced on each connector of the second antenna ANT2, said second antenna ANT2 being a magnetic loop operating at 125 kHz. More precisely, an inductive input component COMP_E is placed between the input connector CE and the input pin BE, and an inductive output component COMP_S is placed between the output connector CS and the output pin BS. This has the effect of making the imaginary portion X of the impedance Z of the second antenna ANT2 seen in high frequency (between 300 and 1 000 MHz) always positive.

The input component COMP_E and the output component COMP_S are ideally pure inductances, but are, in other embodiments, stop impedances or inductances for example. The value of these components is calculated so that at low frequency (e.g. at 125 kHz) their introduction into each of the connectors CE, CS of the second antenna ANT2 does not cause any significant change in the initial tuning of said second antenna ANT2. Ideally, this value is less than one percent of the inductive value of the second antenna ANT2. The value must nevertheless be sufficient for rejecting the resonant frequency of the parasitic loop below the start of the 300-1 000 MHz band.

Furthermore, components COMP_E, COMP_S, are placed so as to minimize the distance between the connectors CE, CS of the second antenna ANT2 and the start of the conductive track leading to the tuning capacitor C and the rest of the electronic circuit. The best positioning is directly at the exit from the solder pads of the second antenna ANT2. In one embodiment, the components COMP_E, COMP_S are integrated directly into the housing of the second antenna ANT2.

Figures 1, 2:
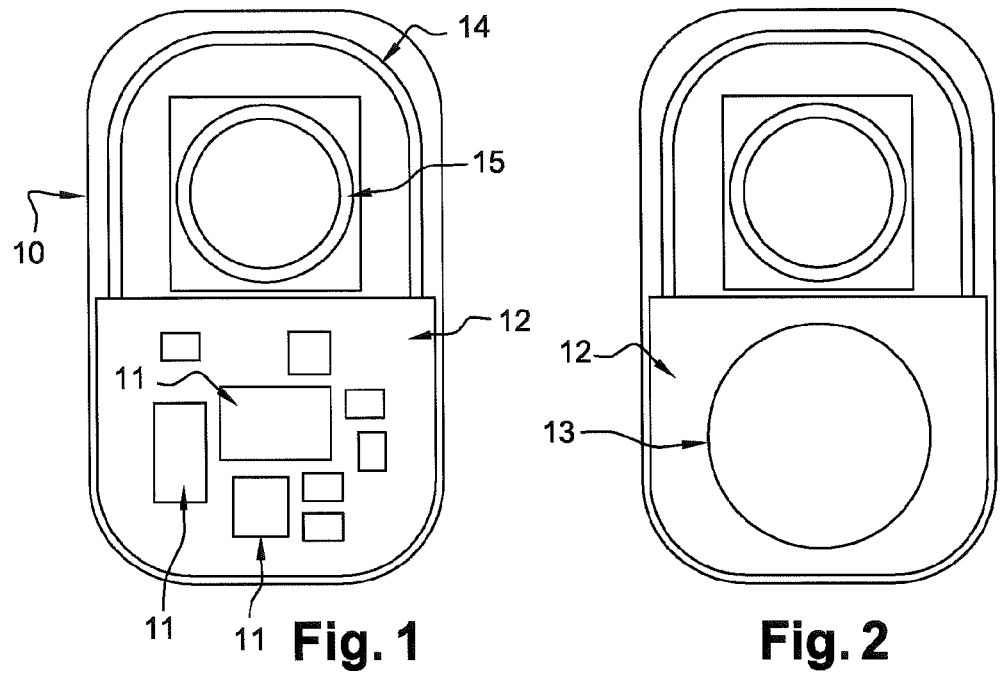
in FIG. 1, already described, a schematic representation of a front view of an automobile telecontrol according to the prior art,
  in FIG. 2, already described, a schematic representation of a back view of the telecontrol in FIG. 1,
  in FIG. 3, already described, an equivalent electronic diagram of a telecontrol for an automobile according to the prior art,
  in FIG. 4, an equivalent electronic diagram of a telecontrol for an automobile according to one embodiment of the invention,
  in FIG. 5, an example of embodiment of a telecontrol for an automobile according to one embodiment of the invention,
  in FIG. 6, a graph illustrating the impact of magnetic coupling between two antennas of a telecontrol according to the prior art, on the resonance of one of these antennas,
  in FIG. 7, a graph illustrating the resonance of the antenna in question, following the suppression of the magnetic coupling between the two antennas.
Figure 3:
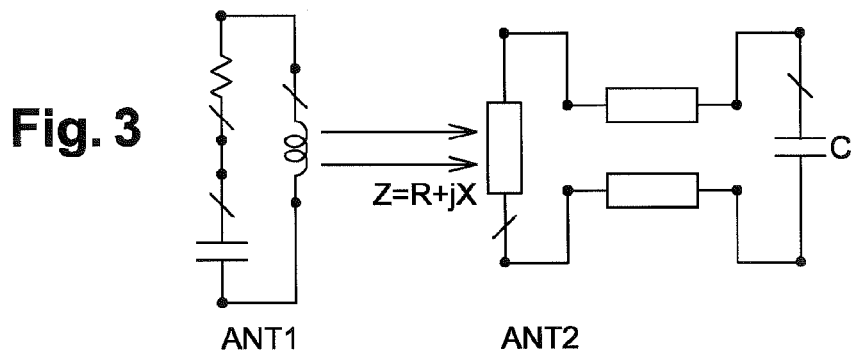

Thus, at the working frequency of the second antenna ANT2 (125 kHz), the impact of the addition of the two inductive components COMP_E, COMP_S is not significant in relation to the value of the inductive portion of the second antenna ANT2. The ratio is actually less than 0.01%. Similarly, the loss resistance of the two inductive components COMPE, COMP_S not represented in FIG. 3, is much lower than the resistive value of the second antenna ANT2.

In addition, at high frequency (300 to 1 000 MHz), the reactive impedance value of each of the two inductive components COMP_E, COMP_S added together (with a positive imaginary value) is able to completely erase the negative part of the reactance of the impedance Z (equal to X at the frequency of the first antenna ANT1) so that the latter value is always positive.

At high frequency, there is therefore virtual separation, in the light of the impedances involved, between the coil of the second antenna ANT2 and the rest of the electronics of the telecontrol TEL.

Thus, at high frequency, the current flow induced by the magnetic coupling between the first antenna ANT1 and a second antenna ANT2 originating from the presence, in the circuit of the second antenna ANT2, of a very high impedance value making this current virtually zero, is prevented. There is therefore no, or almost no magnetic interaction between the antennas ANT1, ANT2.

Figure 6:
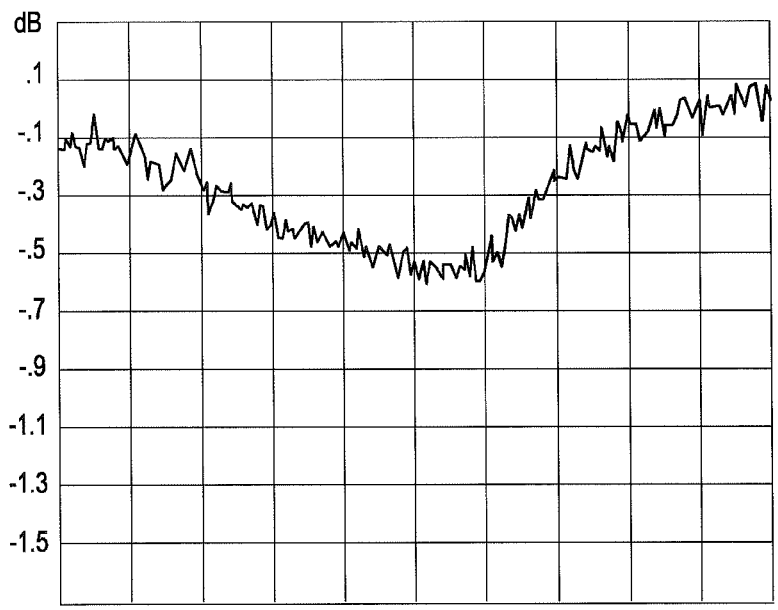
Figure 7:
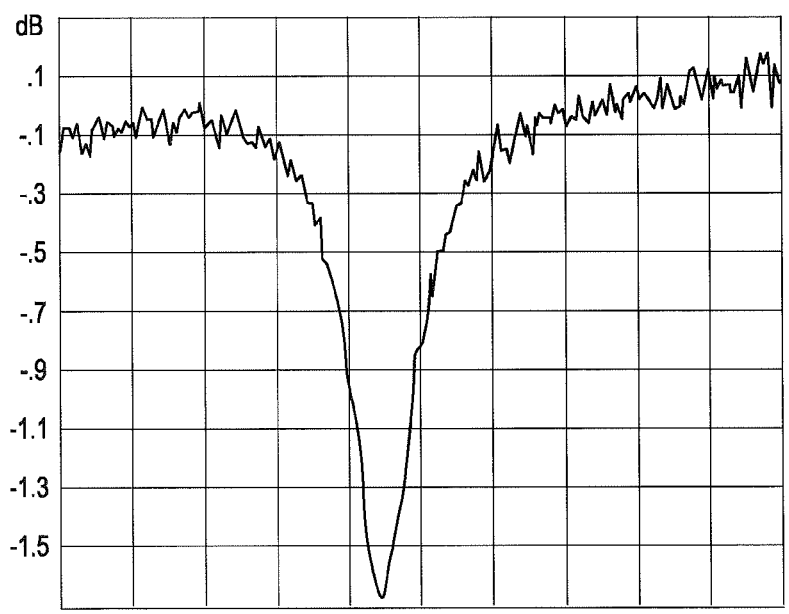

FIGS. 6 and 7 illustrate the contribution of the invention at a frequency of 434 MHz. In the example illustrated, the two inductive components COMP_E, COMP_S have a value of 100 nH. In the case represented in FIG. 6, the two inductive components COMP_E, COMP_S are short-circuited, which corresponds to telecontrols of the prior art, while in the case represented in FIG. 7, the two inductive components COMP_E, COMPS are in service. Comparison of the graphs demonstrates the effectiveness of the separation at high frequency of the two antennas ANT1, ANT2. Note the natural resonance of the first antenna ANT1 the quality factor of which is no longer hampered by the absorption of the second antenna ANT2 due to the magnetic coupling.

Furthermore, in one embodiment, the method of producing the second antenna ANT2 is modified for ensuring that in the frequency band 300 to 1 000 MHz, the reactive impedance value Z is never negative. Moreover, in another embodiment, the inductive components COMP_E, COMP_S are introduced into the body of the second antenna ANT2 component, between the connectors CE, CS of the second antenna ANT2 and the start of the winding of the path presenting the most risk of inductive coupling.

The invention claimed is:

1. A telecontrol (TEL) for locking/unlocking and starting a motor vehicle comprising:
    an electronic circuit (ELEC) including at least one path comprising an input pin BE and an output pin BS;
    a first radio frequency antenna (ANT1) including a first loop arranged in the plane of the electronic circuit (ELEC);
    a second radio frequency antenna (ANT2) including a second loop arranged in the plane of the electronic circuit (ELEC), said second antenna (ANT2) comprising:
        an input connector (CE) connected to the input pin (BE),
        an output connector (CS) connected to the output pin (BS),
        a tuning capacitor (C) connected to the electronic circuit (CIRC), for tuning the second antenna (ANT2) on a tuning frequency;
    an inductive input component (COMP_E) placed between the input connector (CE) and the input pin (BE); and
    an inductive output component (COMP_S) placed between the output connector (CS) and the output pin (BS).

2. The telecontrol (TEL) as claimed in claim 1, wherein the inductive value of the input component (COMP_E) and/or the inductive value of the output component (COMP_S) are less than one percent of the inductive value of the second antenna (ANT2).

3. The telecontrol (TEL) as claimed in claim 1, wherein the input component (COMP_E) is positioned so as to minimize the distance between the input connector (COMP_E) and the input pin (BE), and/or the output component (COMP_S) is positioned so as to minimize the distance between the output connector (CS) and the output pin (BS).

4. The telecontrol (TEL) as claimed in claim 1, characterized in that the input component (COMP_E) is directly connected to the input connector (CE) and/or the output component (COMP_S) is directly connected to the output connector (CS).

5. The telecontrol (TEL) as claimed in claim 1, wherein the input component (COMP_E) and/or the output component (COMP_S) are integrated into the housing of the second antenna (ANT2).

6. The telecontrol (TEL) as claimed in claim 1, wherein the reactive impedance value of the second loop is positive.

7. The telecontrol (TEL) as claimed in claim 1, wherein the electronic circuit (ELEC) comprises at least two paths, and the path considered is that presenting the most risk of inductive coupling between the first loop and the second loop.

8. The telecontrol (TEL) as claimed in claim 1, wherein the input component (COMP_E) and/or the output component (COMP_S) are pure inductances.

* * * * *